(12) United States Patent  (10) Patent No.: US 6,592,238 B2
Cleaver et al.  (45) Date of Patent: Jul. 15, 2003

(54) ILLUMINATION DEVICE FOR SIMULATION OF NEON LIGHTING

(75) Inventors: Mark Joseph Cleaver, Wilmette, IL (US); Eric Olav Eriksson, Evanston, IL (US); George R. Hulse, Cookeville, TN (US)

(73) Assignee: Light Technologies, Inc., Evanston, IL (US)

( * ) Notice: Subject to any disclaimer, the term of this patent is extended or adjusted under 35 U.S.C. 154(b) by 0 days.

(21) Appl. No.: 09/982,705

(22) Filed: Oct. 18, 2001

(65) Prior Publication Data

US 2002/0191386 A1 Dec. 19, 2002

Related U.S. Application Data

(60) Provisional application No. 60/265,522, filed on Jan. 31, 2001.

(51) Int. Cl.$^7$ ............................................... F21V 21/00
(52) U.S. Cl. ..................... 362/249; 362/219; 362/800; 362/267; 362/235
(58) Field of Search ................................. 362/235, 249, 362/252, 800, 219, 240, 267

(56) References Cited

U.S. PATENT DOCUMENTS

| | | | |
|---|---|---|---|
| 4,111,520 A | 9/1978 | Bernal G. | |
| 4,298,869 A | 11/1981 | Okuno | |
| 4,376,946 A | 3/1983 | Kaminow et al. | |
| 4,597,033 A | * 6/1986 | Meggs et al. | ................ 362/183 |
| 4,607,317 A | 8/1986 | Lin | |
| 4,767,172 A | 8/1988 | Nichols et al. | |
| 4,785,567 A | * 11/1988 | Consiglio | .................... 43/17.5 |
| 4,891,896 A | * 1/1990 | Boren | .......................... 40/541 |
| 4,976,057 A | * 12/1990 | Bianchi | ....................... 40/579 |
| 4,996,632 A | 2/1991 | Aikens | |
| 5,057,981 A | 10/1991 | Bowen et al. | |

(List continued on next page.)

Primary Examiner—Thomas M. Sember
(74) Attorney, Agent, or Firm—Stites & Harbison, PLLC; Vance A. Smith; David W. Nagle, Jr.

(57) ABSTRACT

An illumination device for simulating neon lighting comprising a plurality of space point light sources positioned adjacent a lateral light receiving surface of a substantially rod-like waveguide. The waveguide is made of a material that preferentially scatters light entering the light receiving surface such that the light intensity pattern exiting a lateral light emitting surface of the waveguide has a substantially uniform light intensity pattern.

35 Claims, 9 Drawing Sheets

U.S. PATENT DOCUMENTS

| | | |
|---|---|---|
| 5,151,679 A | 9/1992 | Dimmick |
| 5,201,020 A | 4/1993 | Kannabiran |
| 5,219,217 A | 6/1993 | Aikens |
| 5,301,090 A | 4/1994 | Hed |
| 5,303,133 A | 4/1994 | Wagner |
| 5,365,411 A | 11/1994 | Rycroft et al. |
| 5,375,043 A | 12/1994 | Tokunaga |
| 5,410,453 A | 4/1995 | Ruskouski |
| 5,416,679 A | 5/1995 | Ruskouski et al. |
| 5,459,955 A | 10/1995 | Ruskouski et al. |
| 5,475,786 A | 12/1995 | Nishiguchi et al. |
| 5,497,440 A | 3/1996 | Croitoru et al. |
| 5,526,236 A | 6/1996 | Burnes et al. |
| 5,537,297 A | 7/1996 | Ghandehari |
| 5,588,236 A | 12/1996 | Suzuki |
| 5,613,751 A | 3/1997 | Parker et al. |
| 5,618,096 A | 4/1997 | Parker et al. |
| 5,640,792 A | 6/1997 | Smith et al. |
| 5,694,513 A | 12/1997 | Okaniwa |
| 5,842,297 A | 12/1998 | Tung |
| 5,876,107 A | 3/1999 | Parker et al. |
| 5,879,076 A | 3/1999 | Cross |
| 5,887,968 A | 3/1999 | Logan |
| 5,921,652 A | 7/1999 | Parker et al. |
| 5,934,792 A * | 8/1999 | Camarota ............. 362/249 |
| 5,950,340 A | 9/1999 | Woo |
| 5,964,518 A | 10/1999 | Shen |
| 5,996,263 A | 12/1999 | Black |
| 6,023,869 A | 2/2000 | Durbin |
| 6,042,248 A | 3/2000 | Hannah et al. |
| 6,076,294 A | 6/2000 | Durbin |
| 6,079,838 A | 6/2000 | Parker et al. |
| 6,095,673 A | 8/2000 | Goto et al. |
| 6,123,442 A | 9/2000 | Freier et al. |
| 6,146,006 A | 11/2000 | Cross |
| 6,158,882 A | 12/2000 | Bischoff, Jr. |
| 6,186,645 B1 * | 2/2001 | Camarota ............. 362/249 |
| 6,193,385 B1 | 2/2001 | Maki et al. |
| 6,204,899 B1 | 3/2001 | Hall |
| 6,283,612 B1 * | 9/2001 | Hunter ............. 362/240 |
| 6,354,714 B1 * | 3/2002 | Rhodes ............. 362/153.1 |
| 6,361,186 B1 * | 3/2002 | Slayden ............. 362/249 |
| 6,394,623 B1 * | 5/2002 | Tsui ............. 362/249 |

* cited by examiner

ILLUMINATION DEVICE FOR SIMULATION OF NEON LIGHTING

This application claims priority from Provisional Application No. 60/265,522 filed Jan. 31, 2001 entitled Simulated Neon Lighting for Illumination of Objects.

BACKGROUND OF THE INVENTION

The present invention relates to illumination devices using optical waveguide and, more particularly, to lighting devices for the simulation of neon lighting using optical waveguides and high intensity low voltage light sources and ideally adapted for signage and advertising uses.

Neon lighting, produced by the electrical stimulation of the electrons in the low pressure neon gas filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications including script writing and designs because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have axially even light distribution over its length and substantially even about its circumference. Equally important, such lighting devices must have a brightness that is at least comparable to neon lighting. Further, since neon lighting is a well established industry, a competitive lighting device must be light in weight and have superior "handleability" characteristics in order to make inroads into the neon lighting market. Neon lighting is recognized as being fragile in nature. Because of the fragility and heavy weight primarily due to its supporting infrastructure, neon lighting is expensive to package and ship. Moreover, it is extremely awkward to initially handle, install, and/or replace neon lighting structures. Any lighting device that can provide those previously enumerated positive characteristics of neon lighting while minimizing its size, weight, and handleability shortcomings will provide for a significant advance in the lighting technology.

U.S. Pat. No. 4,891,896 issued on Jan. 9, 1990 to Boren and assigned to the Gulf Development Company is an example of many attempts to duplicate neon lighting. Like this attempt, most prior art neon simulations have resulted in structures difficult to fabricate and providing a little in the way of weight and handling benefits. The Boren patent exemplifies this by providing a plastic panel with essentially bas-relief lettering. The material comprising the lettering is transparent and coated with a translucent material. The surrounding material is opaque. When the panel is back lit the lettering tends to glow with a neon-like intensity.

The more recent introduction of light weight and breakage resistant point light sources as exemplified by high intensity light emitting diodes ("LEDs") have shown great promise to those interested in illumination devices that may simulate neon lighting and have stimulated much effort in that direction. However, the twin attributes of neon lighting, uniformity and brightness, have proven to be difficult obstacles to hurdle as such attempts to simulate neon lighting have largely been stymied by the tradeoffs between light distribution to promote the uniformity and brightness. For example, U.S. Pat. No. 4,976,057 issued Dec. 11, 1990 to Bianchi describes a device that includes a transparent or translucent hollow plastic tubing which is mounted in juxtaposition to a sheet of material having light transmitting areas that are co-extensive to the tubing. The sheet is back lit by light sources such as LEDs which trace the configuration of the tubing. The tubing can be made into any shape including lettering. While the tubing may be lit by such arrangement, the light transfer efficiencies with such an arrangement is likely to result in a "glowing" tube having insufficient intensity to match that of neon lighting. The use of point light sources such as LEDs may provide intense light that rival or exceed neon lighting, but when arranged in arrays lack the uniformity needed and unfortunately provide alternate high and low intensity regions in the illuminated surfaces. Attempts to smooth out the light has resulted in lighting that has unacceptably low intensity levels.

It is therefore a paramount object of the present invention to provide for an energy efficient, virtually unbreakable alternative to neon lighting.

A further important object of the present invention is to provide for a lighting device that is safe to transport and economical to operate while providing all of the application virtues of neon lighting including uniformity and brightness.

Yet another object of the present invention is to provide for an alternative to neon lighting that is environmentally friendly, requiring no neon gas, and running on significantly less electricity that its neon equivalent.

Still another important object is to provide for a neon equivalent that is easy to install without complex high voltage electrical installations.

Yet a further object is to provide for a lighting device that can be placed in hostile environments such as in a freezer case without need for protective guards against accidental contact by customers.

These and other objects of the invention will become readily apparent and addressed through a reading of the discussion below and appended drawings.

SUMMARY OF THE PRESENT INVENTION

The present invention utilizes a profiled rod of material having waveguide characteristics that preferentially scatters light entering one lateral surface ("light receiving surface") so that the resulting light intensity pattern emitted by another lateral surface of the rod ("light emitting surface") is elongated along the length of the rod. A light source extends along and is positioned adjacent the light receiving surface and spaced from the light emitting surface a distance sufficient to create an elongated light intensity pattern with a major axis along the length of the rod and a minor axis that has a width that covers substantially the entire circumferential width of the light emitting surface. In a preferred arrangement, the light source is a string of point light sources spaced a distance apart sufficient to permit the mapping of the light emitted by each point light source into the rod so as to create elongated and overlapping light intensity patterns along the light emitting surface and circumferentially about the surface so that the collective light intensity pattern is perceived as being uniform over substantially the entire light emitting surface when being viewed from a normal head-on and side perspectives.

DETAILED DESCRIPTION OF THE INVENTION

To provide the desired result, i.e., an illumination device that is an effective simulator of neon lighting, it is important that the proper materials be selected for the component parts and those parts appropriately and geometrically positioned so that the resulting illumination device has an essentially uniform light intensity distribution pattern over the entire surface with the maximum obtainable brightness. To accomplish this, it is necessary to use a high intensity but dimensionally small light source together with an element that acts both as an optical waveguide and light scattering member, but permits light to exit laterally out of its surface (a "leaky waveguide"). By placing the light source contiguous such a leaky waveguide in a specific manner so as to cause the waveguide to uniformly glow over its lateral surface while maximizing the amount of light exiting the surface, applicants are able to obtain an illumination device that rivals or surpasses the uniform glow of neon tubing. There are many light sources which have the necessary light intensity output that is required but most are dimensionally too big to be practical, are fragile, or consume too much energy. It has been further observed that the best light source would likely be one with a small diameter that provided a uniform light output over an extended length. However, such light sources have not yet been developed to the technological state providing the intensity needed. Thus, applicants have determined that the best available light source for the purpose here intended is a string or strings of contiguously mounted, essentially point light sources such as spaced apart high intensity LEDs.

The ultimate objective of the illumination device of the present invention is to simulate an illuminated neon tube that glows with the proper intensity and uniformity over its length. Thus, applicants have determined that it is important that the leaky waveguide (used to simulate the neon tube) be comprised of a profiled rod of material having sufficient diffusivity that collectively with the other components of the invention visually eliminates any recognizable individual light distribution light pattern that originates from a respective LED or other light source. As stated above, the profiled waveguide preferentially scatters light along its length but ultimately allows light to exit through its lateral surfaces. Such a waveguide provides a visible elongated or oval-like light pattern for each LED, brightest at the center and diminishing continuously out from the center along the major and minor axis of the pattern. By spacing the LEDs a certain distance apart and each LED an appropriate distance from the exposed and lateral far side of the leaky waveguide, the light intensity distribution patterns on the surface of far side of the leaky waveguide are caused to overlap to such an extent that the variations in the patterns are evened out. This causes the collective light pattern on the lateral surface to appear to an observer to have an uniform intensity along the length of the waveguide. Other components of the illumination device of the present invention including, for example, the shape of the light sources may assist in establishing the required brightness and uniformity.

Structurally, the preferred embodiment of the present invention is portrayed in FIGS. 1–6 and shown generally as character numeral 10. The device 10 may be considered as having two major body components. The first component is a waveguide 12 having an exposed curved lateral surface 13 serving as the light emitting surface and a hidden lateral surface 15 (best seen in FIG. 3) that serves as the light receiving surface. Waveguide 12 is the aforementioned leaky waveguide and surface 13 serves as the counterpart to the neon tube. That is, the light laterally entering the waveguide from a light source juxtaposed to the surface 15 is preferentially scattered so as to exit with a broad elongated light intensity distribution pattern out of surface 13.

Visually, the waveguide 12, when not illuminated internally, has a milky appearance due to the uniform scattering of ambient light that enters the waveguide and that ultimately exits the lateral surface thereof. Applicants have found that acrylic material appropriately treated to scatter light and to have high impact resistant to be the preferred material for use in forming the waveguide components of the present invention. When shaped into the profiled rods, the rods take on the desired leaky waveguide characteristics. Moreover, such material is easily molded or extruded into rods having the desired shape for whatever illumination application may be desired, is extremely light in weight, and withstands rough shipping and handling. While acrylic material having the desired characteristics is commonly available, it can be obtained, for example, from AtoHaas, Philadelphia, Pa. under order number DR66080 with added frosted characteristics. When shaped into a rod, such acrylic material is observed to have the leaky waveguide characteristics desired. Other materials such as such as beaded blasted acrylic or polycarbonate, or painted acrylic or polycarbonate provided with the desired preferential light scattering characteristics may be used as well for other applications.

Figure 3:
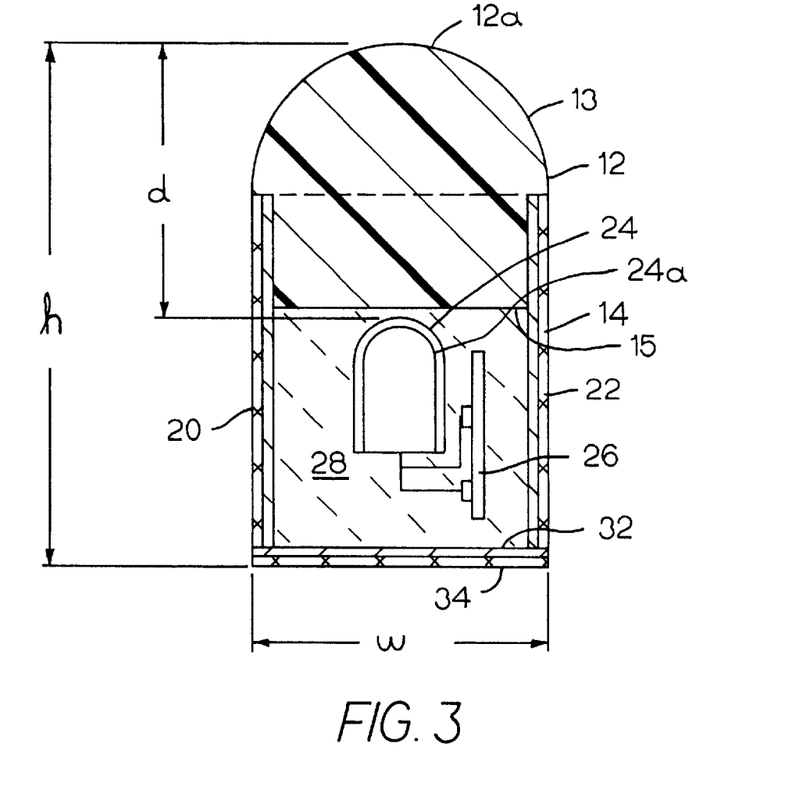
FIG. 3 is an expanded side view of the illumination device as shown in FIG. 1.
Figure 3A:
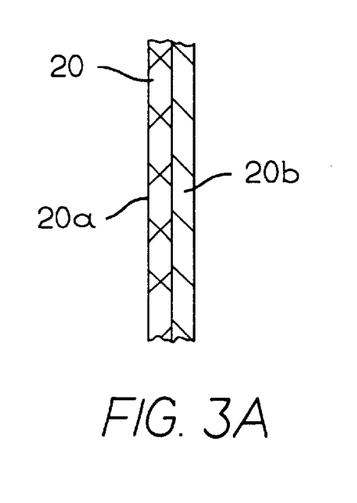
FIG. 3A is an enlarged wall segment of the illumination device shown in FIG. 3.

The second component of the present invention is a housing 14 positioned adjacent the surface 15 of the waveguide 12. Housing 14 comprises a pair of side walls 20, 22 abutting and downwardly extending from the surface 14 and defining an open ended channel 18 that extends substantially the length of waveguide 12. The housing 14 generally functions to house the light source and electrical accessories and to collect light not emitted directly into surface 15 and redirect it to the waveguide In other words, the housing further serves to increase the light collection efficiency by directing by reflection the light incident upon the internal surfaces of the housing into the waveguide 12 and assist in the scattering of the light. From a viewer's perspective, it is desirable that the visual appearance of the housing 14 not be obtrusive with respect to the glowing surface 13 of the waveguide 12; thus, it is preferred that the outside surface of the housing be light absorbing and thus visually dark to an observer. Again, it is preferred that the housing also be made from an impact resistant acrylic material with the outer walls 20 and 22 having an outer regions formed from a dark pigmented, thus light absorbing, acrylic while the inner regions are made from a white pigmented, thus light reflecting, acrylic. The two regions are best viewed in FIG. 3A show an enlarged segment of wall 20 in which the outer region 20a is the dark acrylic and the inner region 20b is the white acrylic. Such acrylic materials preferably are the same as used for the waveguide. While the waveguide 12 and housing 14 may be separately formed and then appropriately joined, it is preferred that the components be molded or extruded as a unit in long sections with the channel 18 already formed.

Figure 3B:
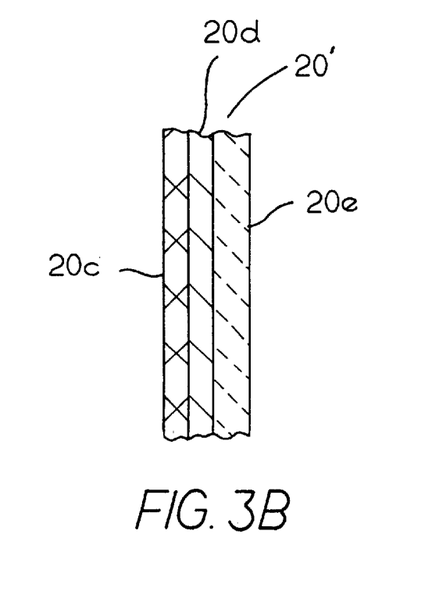
FIG. 3B is an enlarged wall segment like that shown in FIG. 3A with a variation in its structure.
Figure 4:
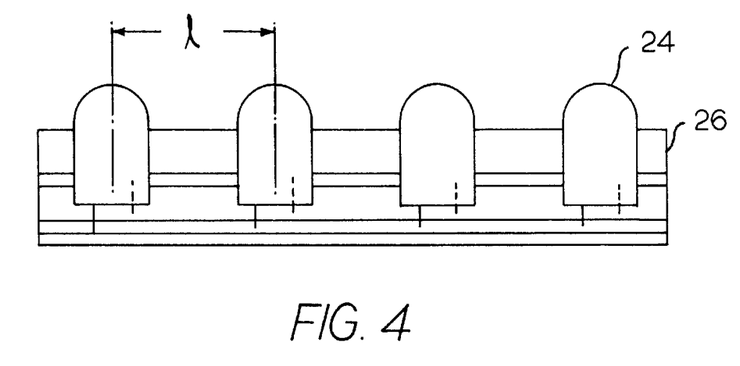
FIGS. 4, 5, and 6 are respective front, side, and top elevation views of the diodes connected to an electrical board as used in the present invention with FIG. 5 also showing the configuration of the light emitting diodes and electrical board within the device.

An alternate wall structure is shown in FIG. 3B in which the wall 20' has three components, an outer dark region 20c, and intermediate light reflecting 20d, and a transparent wall 20e which may be comprised of a scattering acrylic like the waveguide. The outer and intermediate regions 20c and 20d could be dark and white coatings painted on the wall 20' which itself may be comprised of a transparent acrylic material or scattering acrylic. The light reflecting coatings can be of a color matching the color of the LED if desired.

Although the above discussion sets forth a preferred construction of the housing, it should be understood that in some applications the reflecting and absorption characteristics may be provided by light reflecting and absorption paint or tape. Additionally, where there is little concern about the visibility of the housing, it may not be necessary to provide the light reflecting and/or absorption characteristics to the outer surface of the side walls.

Figure 5:
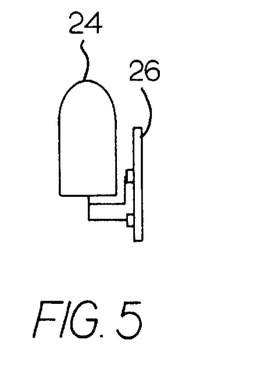
Figure 5A:
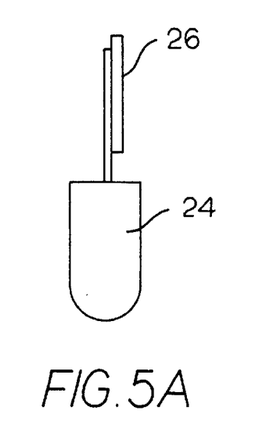
FIGS. 5A and 5B show side views of alternate configurations of the diodes and electrical board as positioned in the present invention.
Figure 5B:
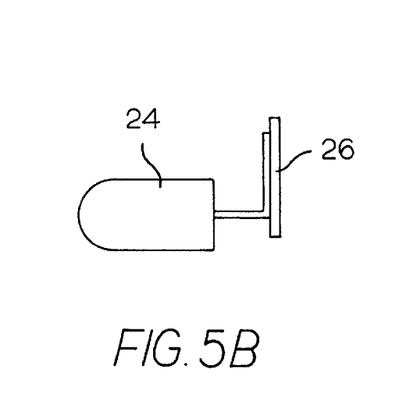

One the most beneficial attributes of the present invention is the ease that the illumination device 10 can be bent to form designs or lettering. The channel 18 permits the device 10 can easily be deformed and bent into the desired shape. Once the device 10 has been shaped, the LEDs 24 and the electrical connection board 26 are then inserted into the channel 18 and then the channel 18 be filled with a filler compound. Thereafter the filler or potting compound is permitted to harden, thus maintaining the positioning of the LEDs and circuit board 26. There are various configurations of the LEDs 24 and board 26 that may be positioned within the channel 18. Examples of the configurations are shown in FIGS. 5A and 5B. A preferred configuration is that shown in FIG. 5 because of the compact nature of the arrangement. In this arrangement, it is important, however, to observe the orientation of the circuit board 26 within channel 18 so that the board 26 extends along the length of channel to facilitate bending. The flexibility of the circuit board 26 with attached LEDs 24 permit this post design insertion into the channel 18 with the apex of the LED 24 essentially abutting the lower surface of the waveguide 12 (as illustrated in FIG. 3). It is also important that the potting compound 30 used to fill channel 18 have the desired light transmitting characteristics and be effective in maintaining the positioning of both the LEDs and the board. The potting compound further serves to eliminate air gaps between the LEDs and the waveguide. It is preferable that the potting compound harden into an impact resistant material having an index of refraction essentially matching that of the housing 24a of the LEDs 24 to minimize Fresnel losses at the interface there between. The potting compound further adds strength to the structure by filling in the channel 18 and assists in reducing hot spots from forming on the lateral surface 13. Such potting compounds may be selected from commonly available clear varieties such as, for example, that obtainable from the Loctite Corporation, Rocky Hill, Conn. under the brand name Durabond E-00CL. As is also seen in FIG. 3, the bottom surface of the device 10 may be covered with a light reflecting surface 32 which may be, for example, a white potting compound or paint and this optionally covered with a light absorbing material 34. In those instances where the selected LEDs 24 have a certain color the light reflecting surface may also be selected to have a matching or substantially the same color. To take advantage of ambient light certain dyes may be added to the acrylic material so that the device 10 exhibits some readily distinguishable coloring upon viewing.

The intensity of the point light sources preferably used by the present invention are typically sufficient to provide the requisite brightness. It bears repeating that the quintessentially feature of the present invention, however, is the careful spreading or distribution of the individual light patterns of the point light sources such that the light patterns are preferentially expanded along the light emitting surface and form an oblong or oval-like light intensity pattern. Equally important is that the minor axis of the oval-like light intensity pattern extends substantially the entire circumferential width of the curved light emitting surface. The preferential spreading of each of the light intensity patterns along the waveguide also permits an the overlapping of the individual light patterns. This in turn enables the present invention to provide an observed uniform collective light pattern along and over the entire light emitting surface.

Figure 1:
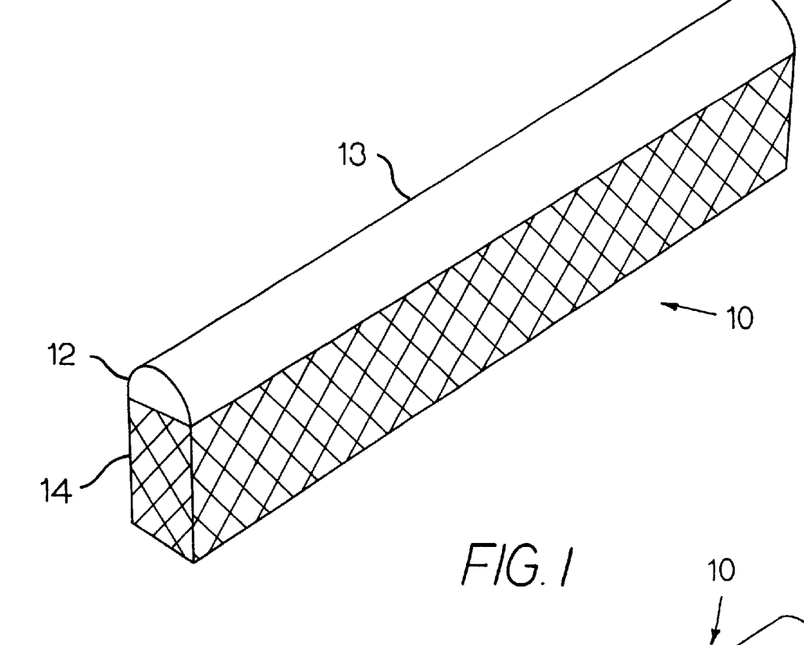
FIG. 1 is an elevated perspective view of an illumination device of the present invention.
Figure 2:
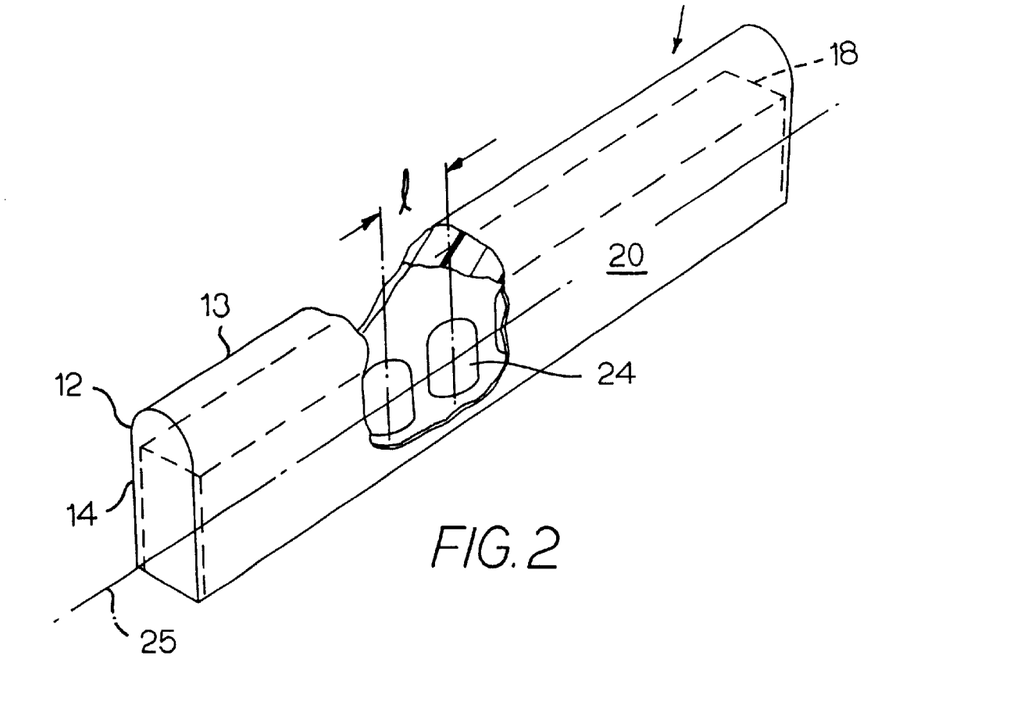
FIG. 2 is perspective similar to that of FIG. 1 with a portion broken away to show the interior.

There are various parameters that have an impact on both the brightness and uniformity of the light intensity pattern emitted by the surface 13 of the waveguide 12. Among the most important are the scattering characteristics of the waveguide material, the spacing "1" between LEDs 24 as shown in FIG. 2, the lensing effect of the LED housing and internal optics where the light emitting portion of the LED resides, the shape and structure of the housing, and the distance "d" (shown in FIG. 3) from the apex of the LED housing 24a to the apex point 12a on the lateral surface 13. To promote uniformity of the light intensity distribution pattern on the surface of the waveguide is that the line of LEDs 24 must be positioned a predetermined distance "d" from apex point 12a of the waveguide. Positioning the LEDs 24 too close to the surface will cause a 'hot spot", i.e., a region of higher light intensity to locally appear on the surface 12a of the waveguide and spoil the quality of the uniform glow. Placing in too far from surface 12a will clearly and undesirably diminish the overall light intensity emanating from the waveguide 12 and may also prevent the minor axis of the oblong or elliptical-like pattern from extending over the circumferential width of the light emitting surface. As an example only, it has been determined that when the curved surface has a radius of curvature of about 3/16 (about 4.76 mm), the device 10 (shown in FIG. 3) has a height "h" of about 31 mm and a width "w" of about 9.5 mm, and the LEDs have a candle power of about 280 mcd and are spaced apart about 12 mm, the distance "d" should be about 17.75 to 17.80 mm. It should be understood, however, that while the above describes a preferred waveguide structure that resembles neon tubing dimensionally, other and different shapes of waveguides may be used yet still providing the desired uniform glow.

Figures 7A, 7B, 7C, 7D:
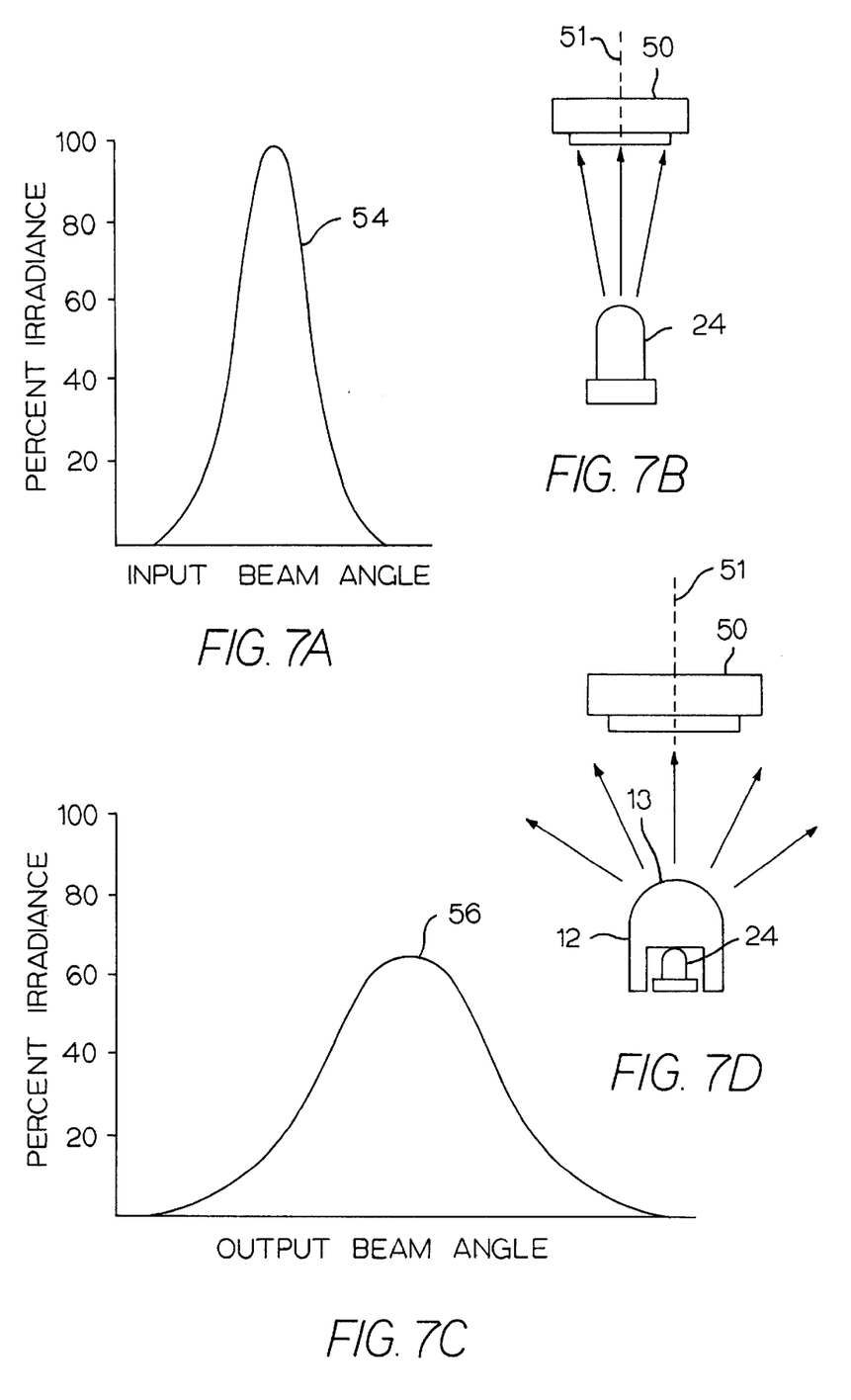
FIGS. 7A and 7B show, respectively, a graph illustrating the light distribution characteristics of a single point light source and a schematic of the device used to measure the same.
FIGS. 7C and 7D show, respectively, a graph illustrating the light distribution characteristics of a single point light source mounted within a device constructed in accordance with the present invention and a schematic of the device used to measure the same.
Figure 7E:
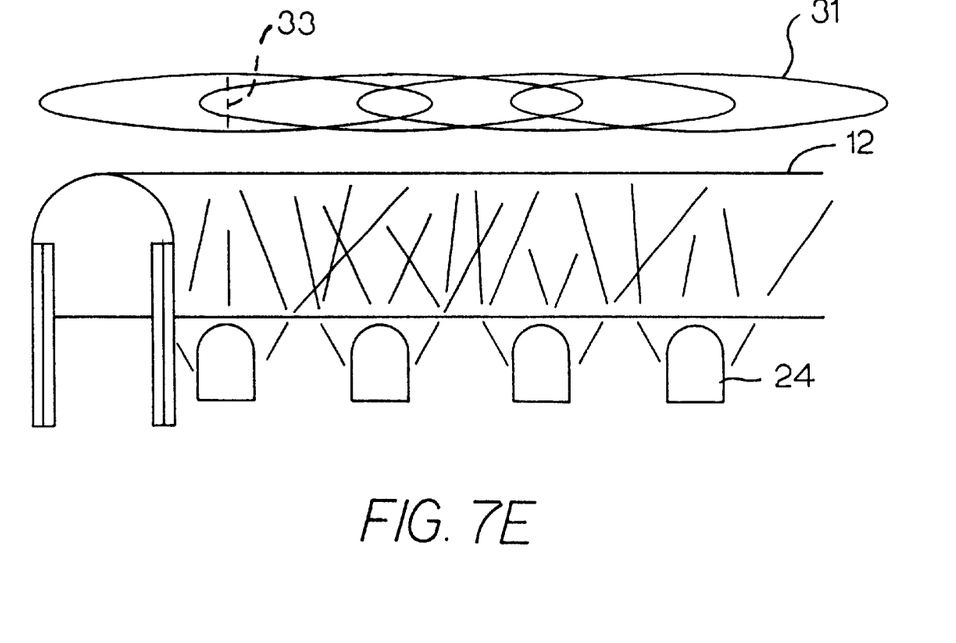
FIGS. 7E and 7F show, respectively, a Mercator-like top projection and a side schematic of the illuminated lateral surface of the waveguide with overlapping individual light distribution patterns.
Figure 7F:
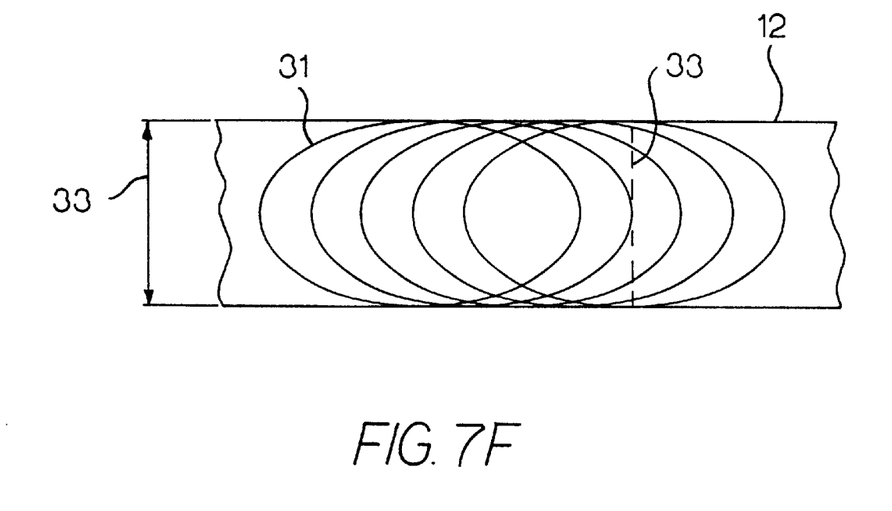

To better understand the principal under which the present invention operates, reference is now made to FIGS. 7A–7F as examples of the changes of the light intensity and spread of the light pattern comparing light intensity and spread of a typical diode to that of an illuminating device constructed in accordance with the present invention. A single LED or point light source provides a narrow light intensity pattern 54 as graphically portrayed by FIG. 7A. Such a graph can be generated by using a photocell type of device 50 portrayed in FIG. 7B and progressively measuring the light intensity at various angles from the center line 51. This light pattern 54 should be contrasted to the one in FIG. 7C in which the pattern 56 is considerably broader with a concomitant reduction in the intensity along the center line 51. FIG. 7C represents the broad pattern emitted by the lateral surface 13 of the waveguide 12 constructed in accordance with the present invention. As stated above, it is important that the distance "d" and the LED spaced apart distance "1" be such that the oval-like intensity patterns of the individual LEDs overlap as portrayed in the schematic representation of FIG. 7E and the projection depicted in FIG. 7C schematically represents a plurality of LEDs 24 providing an broadened overlapping elliptical-like light intensity patterns 31 on the lateral surface 13 of the waveguide 12. FIG. 7E is top view using a Mercator-like projection of the light pattern areas 24 on the lateral surface. 13. The minor axis of the light intensity patterns 31 are represented by dashed lines 33. As stated above, for any given dimension of the waveguide and spacing of the point light sources, it is important that the distance "d" be appropriately set so distance so that the minor axis of the light intensity distribution pattern extends substantially the entire circumferential width of the curved lateral light emitting surface 13. For purposes of this disclosure the light intensity distribution pattern can be defined as the visible area of the light pattern extending out from the center region of the area that is visible discernible by an observer.

Figure 6:
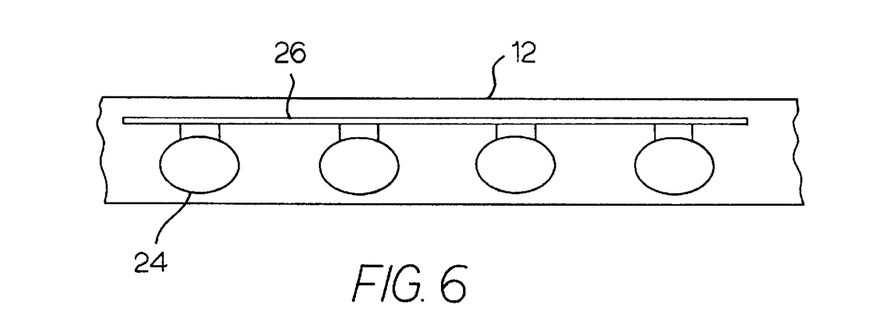
Figure 8:
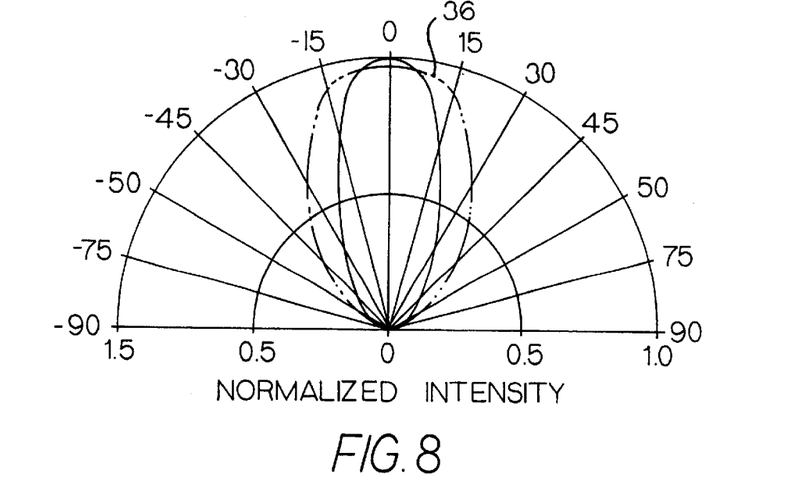
FIG. 8 is normalized pattern of the light distribution using an elliptically shaped LED assisting in creating the elongated light intensity pattern.

To further assist in the preferential diffusion and scattering of the light intensity pattern, applicant has further determined that the use of oval shaped LEDs as shown in FIG. 6 are helpful. The best effect is obtained when the oval shaped LEDs are positioned so that the major axis of the elliptically shaped light patterns seen in top elevation view is directed along the long axis of the waveguide 12. The characteristic light pattern of an oval LED is shown in FIG. 8 depicting graphically normalized light intensity along the major and minor axis. As can be seen, the oval LED tends to direct light along its major axis illustrated by the curve 36.

Figure 12:
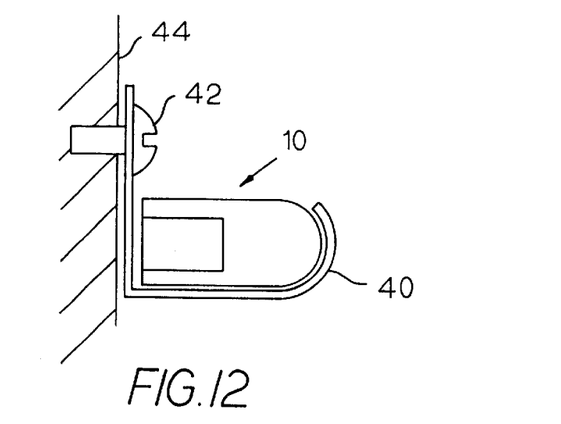
FIG. 12 shows one technique of supporting an illumination device made in accordance with present invention.
Figure 13:
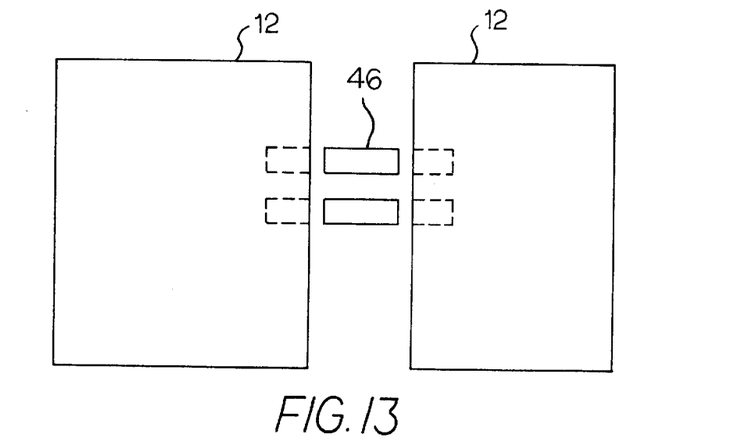
FIG. 13 shows a technique of connecting individual lighting devices made in accordance with the present invention.

The light weight and ruggedness of the illumination device 10 of the present invention lends itself to ready mounting to almost any surface and by a variety of mounting techniques. For example, as illustrated in FIG. 12, an extended length of the device 10 could be mounted in curtain rod fashion to a wall board 44 through the use of a bracket hook 40 and fastener 42. Moreover, successive lengths of the device 10 can be easily juxtaposed such as, for example, depicted in FIG. 13 where dowels 46 of matching refractive indices with the material of the waveguides 12, 12' are inserted in complimentary openings in the respective ends. Other fastening techniques may be employed including gluing of the various lengths together at the ends thereof. In some instances where the lengths when appropriately supported, the ends of the lengths may merely be placed in a juxtaposed touching position. Thus, as can easily be understood, illumination devices 10 of an indeterminate length can easily be installed and supported.

Figure 9A:
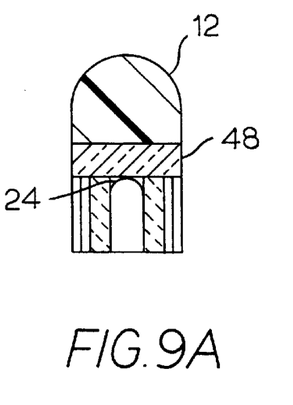
FIGS. 9A, 9B, and 9C show several different internally positions of the LED within the housing of the illumination device in accordance with the present invention.
Figure 9B:
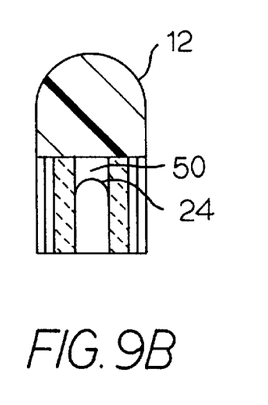
Figure 9C:
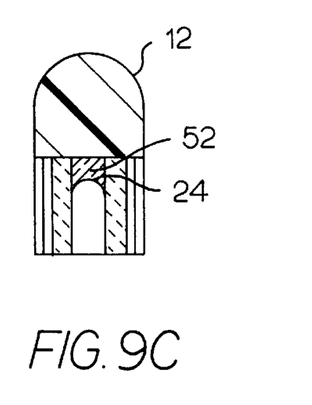

FIGS. 9A, 9B, and 9C represent in schematic form but a few of the alternate constructions in which the LEDs 24 are appropriately spaced from the apex point of the waveguide. FIG. 9A depicts a light scattering spacer member 48 between the waveguide 12 and the LED 24. Such spacer 48 could be fabricated from the same material as the waveguide 12, e.g., a high impact resistant acrylic material. FIG. 9B represents a construction in which the channel 18 is dimensioned so that the LED abuts an inner face of the channel and defines a space 50 between the apex of the LED housing and the waveguide 12. FIG. 3 shows the use of a transparent potting compound that fills the space between the LED 24 and waveguide 12. The compound could easily be introduced into the channel 18 after the LED 24 and circuit board 26 are placed therein.

Figure 10A:
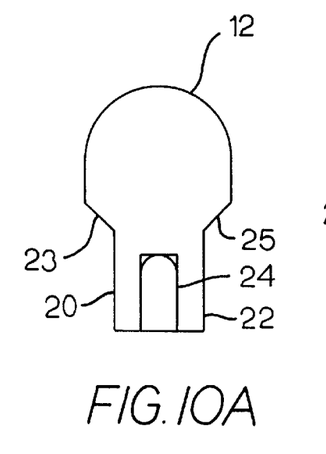
FIGS. 10A and 10B show examples of different housing configurations in accordance with the present invention.
Figure 10B:
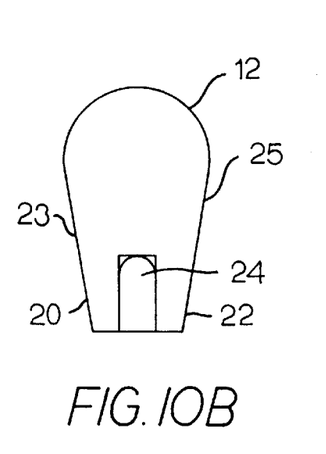
Figure 11:
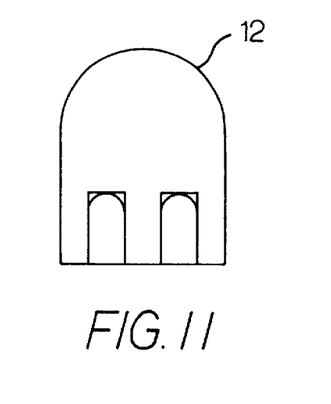
FIG. 11 illustrates the illumination device of the present invention incorporating a plurality of lines of LEDs.

FIGS. 10A and 10B illustrate that the configuration of the illumination device 10 including the waveguide and/or housing could be changed as determined by the application to which the illumination device may be applied. FIG. 10A depicts parallel side walls 20, 22 that merge into sharply diverging side walls 23, 25 of the waveguide 12 while FIG. 10B illustrated as structure in which the walls 20, 22 diverge gradually and blend into the diverging side walls 23, 25 of the waveguide 12. FIG. 11 depicts further variations to the illumination device 10 where multiple strings of LEDs may be used in place of the single one discussed above. The various other elements including the reflective and absorption layers are not shown to maintain clarity.

Figure 14:
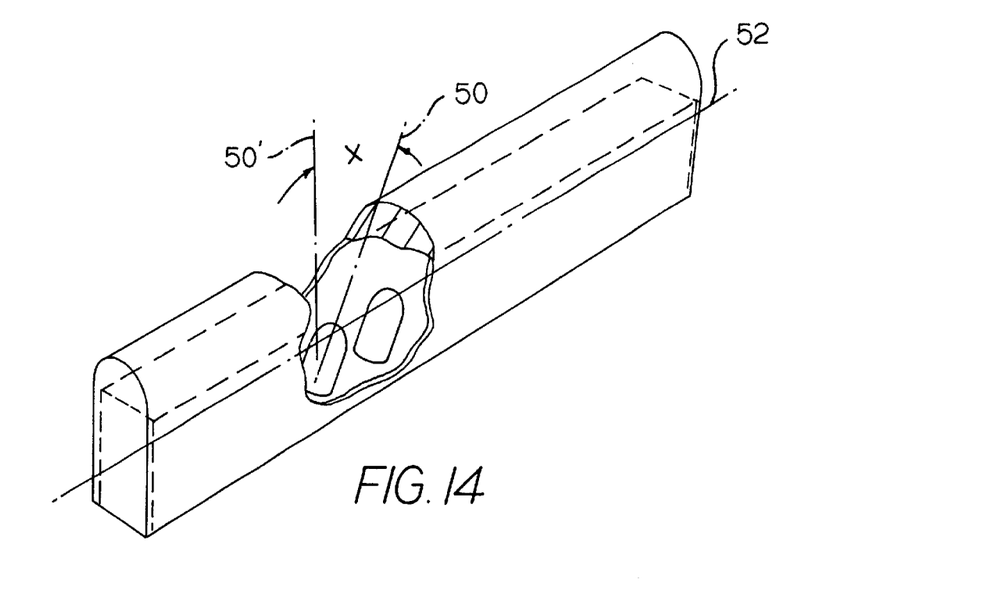
FIG. 14 shows a variation in the preferred embodiment in which the diodes are inclined within the housing.
Figure 15:
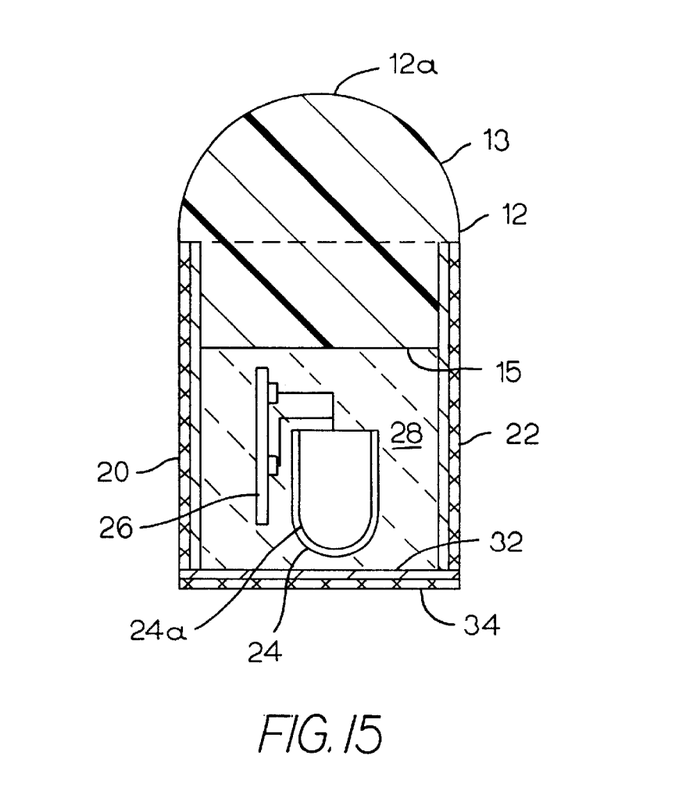
FIG. 15 shows still another variation in which the diodes are inverted within the housing.

Although it is preferred that the LEDs 24 be oriented in an upright position as depicted in FIG. 3 in order to provide the most efficient light intensity along the light pattern, other positioning arrangements may be used. One example is shown in FIG. 14 where the positioning of the LEDs is tilted so that central axis 50' of the LEDs is placed at some predetermined angle X to the normal orientation 50 of the central LED axis to the longitudinal axis 52. FIG. 15 shows the LED 24 positioned with the apex positioned downwardly (vertically positioned or tilted) with respect to the axial length of the waveguide. The light collection of the various reflective surfaces direct the light from the LED 24 to the waveguide for the scattering in the same manner as described above.

Figures 16, 17:
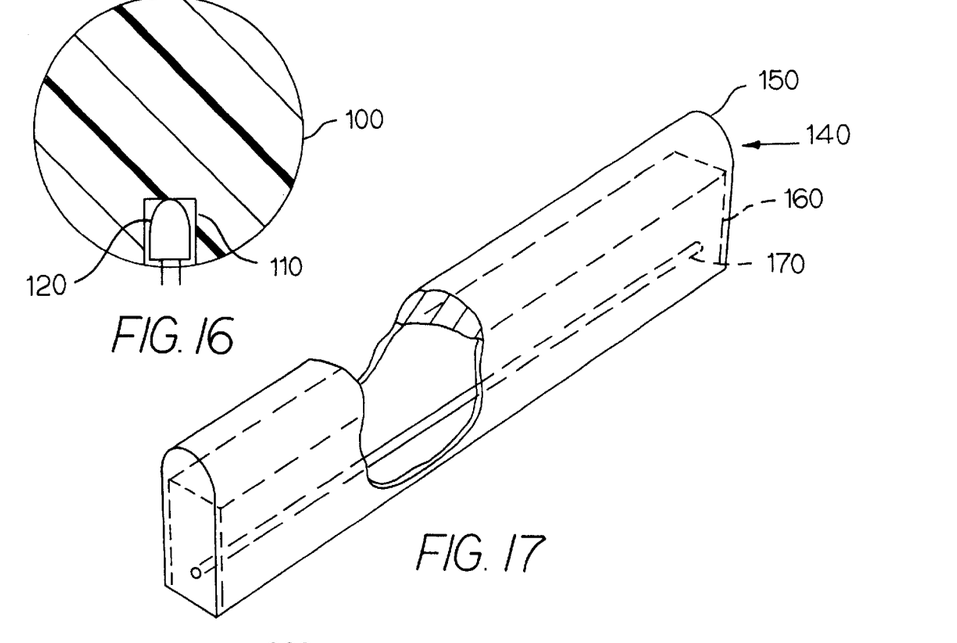
FIG. 16 shows an embodiment in which the LED is positioned within a channel defined in the body of the waveguide itself.
FIG. 17 illustrates still another embodiment in which the light source is a light source that itself is elongated and extends in a parallel relationship to the axis of the waveguide.

FIG. 16 depicts still another structure where the housing 110 of the LED 120 or point light source is incorporated directly in the body of the waveguide 100 with reflective and absorption layers not shown to maintain clarity.

Technology is being developed where a light source may be fabricated in elongated or rope form from, for example, sheets of electro-luminescencing material that has sufficient light intensity to be juxtaposed to a leaky waveguide in place of the strings of LEDs. FIG. 17 illustrates that such a construction of an illumination device 140 showing an elongated light source 170 extending in a parallel relationship with the longitudinal axis of the waveguide 150 within the housing 160.

Figure 18:
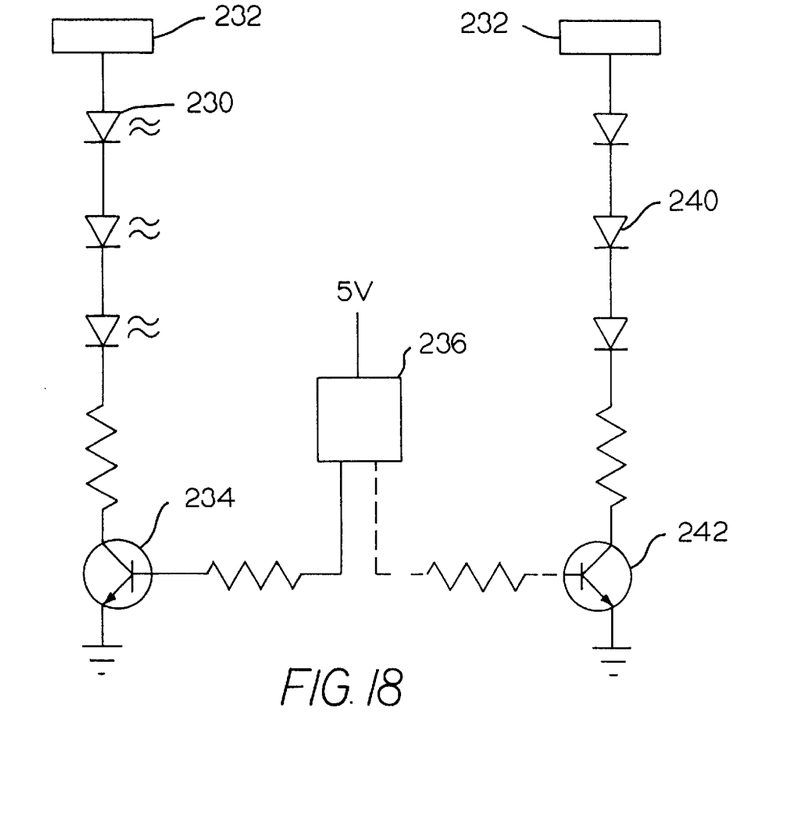
FIG. 18 representing a schematic of electrical circuitry incorporating LEDs for providing lighting sequences that may be used with the illumination device of the present invention.

The thin and flexible circuit board 26 can be obtained from various sources such, as, for example, Flexible Circuit Technologies, Saint Paul Minn. The nature of the electrical connection and the circuitry on the board 26 depend upon the illumination sequence desired. While the circuitry is not part of the invention, it should be observed that the considerable sequence variety is permitted by the nature of the structure of the present invention. That is, the light weight, resistance to the rigors of packaging, handling, shipping, and installation, and the minimal heating aspects of the illumination device permit essentially endless possibilities for lighting and color sequences. The circuit board, may for example, be provided with various electrical components that permit flashing or fading of the light sources in timed sequences and give the effect of movement. Various light source colors can be used and flashed/faded in almost any combination. If the LEDs are interlaced with different colors, then a striping effect can be obtained. FIG. 18 illustrates schematically a circuit which may be used with the present invention. A multiplicity of LEDs 230 are shown connected in series to a remote power source 232 and to a NPN transistor 234 in turned connected to a programmable controller 236. The LEDs 230 may be of the same color or in color groupings as desired. A second set of LEDs 240 (and additional sets of LEDs) similarly connected to the power source 232, NPN transistor 242, and controller 236 may be separately grouped or alternated with LEDs 230 as desired. Using the former grouping, the controller 236 could be programmed to cause the transistors to go on or off, thus causing the first group and then succeeding groups of LEDs to pulse or flash, simulating motion. Should each of the groups mounted in a device form a sequence of words, for example, "drink cola", the words could be flashed in sequence. If the LEDs of various groups were alternated in position, the resulting grouping could form a multi-color striping pattern.

From the discussion above, it may now be appreciated that the illumination device of the present invention is rugged and resists breakage that normally would be expected for neon lighting counterparts in shipping and handling. The illumination sources, preferably solid state lighting devices such as LEDs, uses far less electrical energy and remains relative cool to the touch. This allows the illumination device of the present invention to be used in places where the heat generated by neon lighting precludes its use. Moreover, the light weight of the illumination device facilitates mounting on support structures that could not support the relative heavy weight of neon lighting, and its required accessories including the high voltage infrastructure. Finally, the illumination device is flexible in its use, allowing a tremendous variety of lighting techniques very difficult to obtain in neon lighting without substantial expense. Other advantages and uses of the present invention will be clearly obvious to those skilled in the art upon a reading of the disclosure herein and are intended to be covered by the scope of the claims set forth below.

What is claimed is:

1. A method of making an illumination device capable of simulating neon lighting, comprising the steps of:

forming an essentially solid rod with a predetermined length and a pair of lateral surfaces from material having optical waveguide and light scattering properties such that light entering a first of said lateral surfaces is caused to form an essentially elliptically shaped light intensity pattern that has a major axis in a direction substantially parallel to said predetermined length;

placing a housing having a pair of spaced walls defining a volume in connected relationship with said first lateral surface;

bending said rod and said housing into a desired shape;

positioning a plurality of spaced point light sources connected to a flexible electrical connecting member within said volume between said side walls; and essentially filling said volume with a potting material transmitting light.

2. The method of claim 1 wherein said rod and housing are formed as an integral unit.

3. The method of claim 1 wherein said side walls have interior surfaces that are light reflecting.

4. The method of claim 1 in which said point light sources are LEDs.

5. The method of claim 4 in which said LEDs have transparent housings and said potting compound has an index of refraction essentially matching an index of refraction of said transparent housings.

6. The method of claim 4 in which said LEDs have tinted housings.

7. The method of claim 1 wherein said side wails have exterior surfaces that are light absorbing.

8. An illumination device for simulating neon lighting, comprising:

a substantially rod-like member having a predetermined length with a lateral light receiving surface and a lateral curved light emitting surface having a predetermined circumferential width, said member being comprised of a material that has both optical waveguide and light scattering properties tat preferentially scatters light entering said light receiving surface into an elongated light intensity pattern on said light emitting surface with a major axis extending along said predetermined length;

an elongated light source extending along and positioned adjacent said light receiving surface and spaced from said light emitting surface a sufficient distance to allow said light intensity pattern on said emitting surface to have a minor axis extending substantially the entire circumferential width of said light emitting surface;

a housing in which said light source is positioned, said housing extending along said light receiving surface and having a pair of side walls, each with an interior light reflecting surface and an exterior light absorbing surface; and an electric connecting member positioned within said housing and adapted to connect said light source to a remote power source.

9. The illumination device of claim 8 in which said elongated light source is a multiplicity of spaced point light sources arranged in a line extending substantially along said light receiving surface.

10. The illumination device of claim 9 in which said point light sources are light emitting diodes.

11. The illumination device of claim 10 in which said light emitting diodes have an oval shape with a major axis extending in a direction along said line.

12. The illumination device of claim 10 wherein the light emitting diodes have housings aligned in an essentially upright position wit an apex of each housing juxtaposed to said light receiving surface of said waveguide.

13. The illumination device of claim 10 wherein the light emitting diodes have housings tilted with respect to the length of the waveguide.

14. The illumination device of claim 10 wherein the light emitting diodes have housings arranged in an inverted positions with respect to said light receiving surface.

15. The illumination device of claim 8 in which said housing comprises a flexible material, and said electrical connecting member is sufficiently flexible so as to be bent to conform to any non-linear shape Conned by said housing.

16. The illumination device of claim 15 in which said electric connecting member is a flexible ribbon.

17. The illumination device of claim 8 including a light transmitting material filling an interior space of said housing to maintain positioning of said light source and electric connecting member within said housing.

18. The illumination device of claim 17 in which said light transmitting material is transparent.

19. The illumination device of claim 17 in which said light transmitting material has light scattering characteristics.

20. The illumination device of claim 17 which said light source is comprised of a plurality of light emitting diodes, and said light transmitting material has an index of refraction essentially matching the index of refraction of said light emitting diodes.

21. The illumination device of claim 17 in which said light transmitting material forms a bottom wall extending along the length of said housing, said bottom wall having a light reflecting bottom surface for reflecting light incident thereon into said waveguide.

22. The illumination device of claim 17 in which said light transmitting material is a heat conductor.

23. The illumination device of claim 9 including a light transmitting spacer member positioned between said light source and said light receiving surface and in an substantially abutting relationship wit said light source.

24. The illumination device of claim 8 in which said waveguide and said housing are integral and comprised of an impact resistant material.

25. An illumination device for simulating neon lighting, comprising:

a light transmitting member of a predetermined length having a substantially curved front surface and a light receiving lateral surface, said member being comprised of a material tat has both optical waveguide and light scattering properties that preferentially scatters light entering said light receiving surface into an elongated light intensity pattern on said light emitting surface with a major axis extending along said predetermined length;

a housing having spaced side walls abutting said light receiving lateral surface and defining a volume extending along said predetermined length of said light transmitting member, said side walls having light reflecting interior surfaces and a light absorbing exterior surfaces; and a multiplicity of spaced point light sources housed within said volume and extending along said predetermined length, said spaced point light sources positioned a distance from said curved front surface sufficient to allow a light intensity pattern from each of said point light sources to overlap neighboring light intensity patterns so that the light intensity pattern collectively emitted from said front surface appears uniform.

26. The illumination device of claim 25 in which the interior of said surfaces of said side walls are covered with a light reflecting material and exterior surfaces are covered with a light absorbing material.

27. The illumination device of claim 25 including a spacer member made of transparent material positioned and filling a portion of the volume between said point light sources and said member.

28. The illumination device of claim 27 including a spacer member made of transparent material positioned and filling a portion of the volume between said point light sources and said member.

29. The illumination device of claim 25 in which said point light sources are LEDs.

30. The illumination device of claim 29 in which said electrical member is connected to a processor programmed to cause said LEDs to flash independently.

31. The illumination device of claim 30 in which the LEDs flash in a timed sequence.

32. The illumination device of claim 30 in which said LEDs are flashed in successive groups along the length of the first string thereby simulating movement.

33. The illumination device of claim 32 in which said LEDs of said first string are alternatively positioned along the length of said housing with said LEDs of said second string.

34. The illumination device of claim 27 including a multiplicity of LEDs mounted in a second string positioned within said volume and extending in the direction of elongation of said housing, said second string connected with said electrical member so as to be independently energized.

35. The illumination device of claim 34 in which said LEDs of said first string emit a different color of light from the LEDs of said second string.

* * * * *

UNITED STATES PATENT AND TRADEMARK OFFICE
CERTIFICATE OF CORRECTION

PATENT NO. : 6,592,238 B2  Page 1 of 1
DATED : July 15, 2003
INVENTOR(S) : Mark Joseph Cleaver, Eric Olav Eriksson and George R. Hulse It is certified that error appears in the above-identified patent and that said Letters Patent is hereby corrected as shown below:

<u>Title page,</u>
Item [73], Assignee, should be -- iLight Technologies, Inc. --

<u>Column 10,</u>
Line 39, replace "wails" with -- walls --.
Line 48, replace "tat" with -- that --.

<u>Column 11,</u>
Lines 12 and 49, replace "wit" with -- with --.
Line 19, delete "an" between "in" and "inverted".
Line 23, replace "Conned" with -- formed --.
Line 34, insert -- in -- after "claim 17" and before "which".
Line 48, replace "an" with -- a --.

<u>Column 12,</u>
Line 1, replace "tat" with -- that --.
Line 11, delete the word "a" so lines read -- interior surfaces and light absorbing exterior surfaces --.
Line 42, replace "the" with -- a --.
Line 45, replace "of said second" with -- of a second --.
Line 48, replace "27" with -- 29 --.
Line 53, replace "of said first" with -- of a first --.

Signed and Sealed this

Fourth Day of November, 2003

JAMES E. ROGAN
*Director of the United States Patent and Trademark Office*

(12) INTER PARTES REEXAMINATION CERTIFICATE (520th)

United States Patent
Cleaver et al.

(10) Number: US 6,592,238 C1
(45) Certificate Issued: Feb. 7, 2013

(54) ILLUMINATION DEVICE FOR SIMULATION OF NEON LIGHTING

(75) Inventors: Mark Joseph Cleaver, Wilmette, IL (US); Eric Olav Eriksson, Evanston, IL (US); George R. Hulse, Cookeville, TN (US)

(73) Assignee: ILight Technologies, Inc., Chicago, IL (US)

Reexamination Request:
No. 95/001,348, Apr. 26, 2010

Reexamination Certificate for:
Patent No.: 6,592,238
Issued: Jul. 15, 2003
Appl. No.: 09/982,705
Filed: Oct. 18, 2001

Certificate of Correction issued Nov. 4, 2003.

Related U.S. Application Data

(60) Provisional application No. 60/265,522, filed on Jan. 31, 2001.

(51) Int. Cl.
*F21S 4/00* (2006.01)
*F21V 23/04* (2006.01)

(52) U.S. Cl. ......... 362/246; 362/219; 362/800; 362/267; 362/235

(58) Field of Classification Search .................. None
See application file for complete search history.

(56) References Cited

To view the complete listing of prior art documents cited during the proceeding for Reexamination Control Number 95/001,348, please refer to the USPTO's public Patent Application Information Retrieval (PAIR) system under the Display References tab.

*Primary Examiner* — Linh M. Nguyen (57) ABSTRACT

An illumination device for simulating neon lighting comprising a plurality of space point light sources positioned adjacent a lateral light receiving surface of a substantially rod-like waveguide. The waveguide is made of a material that preferentially scatters light entering the light receiving surface such that the light intensity pattern exiting a lateral light emitting surface of the waveguide has a substantially uniform light intensity pattern.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 1-7, 11, 27, 28, 34 and 35 is confirmed.

Claims 8-10, 12-26 and 29-33 are cancelled.

\* \* \* \* \*